US010167801B2

(12) United States Patent
Jung

(10) Patent No.: US 10,167,801 B2
(45) Date of Patent: Jan. 1, 2019

(54) NVH MANAGEMENT SYSTEM BASED ON FLOOR VIBRATION FOR VEHICLE AND CONTROL METHOD THEREOF

(71) Applicants: Hyundai Motor Company, Seoul (KR); Kia Motors Corporation, Seoul (KR)

(72) Inventor: In-Soo Jung, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/610,584

(22) Filed: May 31, 2017

(65) Prior Publication Data
US 2018/0171919 A1 Jun. 21, 2018

(30) Foreign Application Priority Data
Dec. 16, 2016 (KR) ........................ 10-2016-0172722

(51) Int. Cl.
| | |
|---|---|
| F02D 41/02 | (2006.01) |
| F02D 41/14 | (2006.01) |
| G07C 5/08 | (2006.01) |
| F02D 41/00 | (2006.01) |
| F02D 41/08 | (2006.01) |
| F02D 41/40 | (2006.01) |
| F02D 41/30 | (2006.01) |

(Continued)

(52) U.S. Cl.
CPC ..... F02D 41/1498 (2013.01); F02D 41/0002 (2013.01); F02D 41/08 (2013.01); F02D 41/40 (2013.01); G07C 5/0825 (2013.01); F02D 41/3005 (2013.01); F02D 2009/0233 (2013.01); F02D 2041/228 (2013.01); F02D 2200/025 (2013.01); F02D 2200/50 (2013.01); G07C 5/006 (2013.01)

(58) Field of Classification Search
CPC .. F02D 41/1498; F02D 41/04; F02D 41/3005; F02D 41/0002; F02D 2200/50; G07C 5/0825; G07C 5/006; B60W 10/06; G01M 15/12
USPC ............... 123/192.1, 435; 701/103–105, 111
See application file for complete search history.

(56) References Cited

U.S. PATENT DOCUMENTS

| | | | | |
|---|---|---|---|---|
| 6,427,112 B1* | 7/2002 | Kostun | ................. | G01M 15/00 |
| | | | | 123/184.57 |
| 6,659,078 B2* | 12/2003 | Bergeon | ................ | F02D 35/027 |
| | | | | 123/192.1 |
| 9,075,418 B2* | 7/2015 | Tomizaki | .............. | F16F 15/002 |

FOREIGN PATENT DOCUMENTS

| | | |
|---|---|---|
| JP | 07-186804 | 7/1995 |
| JP | 2008-157100 | 7/2008 |

(Continued)

Primary Examiner — Hai Huynh
(74) Attorney, Agent, or Firm — Morgan, Lewis & Bockius LLP

(57) ABSTRACT

A system for managing noise, vibration and harshness (NVH) based on floor vibration for a vehicle, may include a vibration sensor, which is disposed on a floor of a vehicle and detects a vibration value; and a control module, which controls an operation of a vibration generating device of the vehicle in response to the vibration value detected by the vibration sensor, wherein when the vibration value detected by the vibration sensor exceeds a predetermined first threshold value, the control module decreases the vibration by adjusting a driving parameter of the vibration generating device of the vehicle.

9 Claims, 3 Drawing Sheets

(51) Int. Cl.
    *G07C 5/00* (2006.01)
    *F02D 9/02* (2006.01)
    *F02D 41/22* (2006.01)

(56) References Cited

FOREIGN PATENT DOCUMENTS

KR   1019990058650   7/1999
   KR   1020070054346   5/2007
   KR   1020100064135   6/2010

* cited by examiner

NVH MANAGEMENT SYSTEM BASED ON FLOOR VIBRATION FOR VEHICLE AND CONTROL METHOD THEREOF

CROSS-REFERENCE TO RELATED APPLICATIONS

The present application claims priority to Korean Patent Application No. 10-2016-0172722, filed on Dec. 16, 2016, the entire contents of which is incorporated herein for all purposes by this reference.

BACKGROUND OF THE INVENTION

Field of the Invention

The present invention relates to a system for managing noise, vibration and harshness (NVH) based on floor vibration for a vehicle, and a control method thereof, and more particularly, to a technology, in which a vibration sensor detecting vibrations generated in a floor of a vehicle is installed, and operations of devices causing vibrations of the vehicle are controlled based on the vibrations measured by the vibration sensor in order to manage NVH performance of the vehicle, and further, more particularly, to a technology, in which when the vibration detected by the vibration sensor exceeds a predetermined manageable threshold value, a message inducing a driver to repair a vehicle in relation to the vibrations is output, thereby actively managing NVH performance of the vehicle.

Description of Related Art

In general, as an effort to improve marketability of a vehicle, development for improving performance of the vehicle is continuously made.

Recently, the development of vehicle products achieving the improvement of high performance of a vehicle by the technology development is expanded from the development of performance for improving marketability in the related art to the development for improving ride comfort and user's experience which are represented as emotional quality.

To this end, the vehicle is released in the state where tests under various and minute conditions for the purpose of improving ride comfort and user's experience are completed before the shipment of the product.

One of the important factors influencing ride comfort of the vehicle and user's experience is noise, vibration, and harshness (NVH). The NVH characteristic is a representative factor which is generated in a power train (an engine and the like), a suspension, a chassis, and the like that are driving systems of the vehicle, is transmitted into an internal side of the vehicle through a vehicle body, and is directly/indirectly transmitted to a driver or passengers to hinder ride comfort, and is the important factor, which needs to be maximally decreased for the improvement of marketability of the vehicle.

However, even though a precise test related to the NVH is performed before the shipment of the product of the completed vehicle, it is impossible to completely decrease the NVH characteristic, and there still exists a probability that the NVH performance is degraded according to a condition (vehicle state) of the vehicle different from the state of the test condition of the vehicle or an environment (weather, a road situation, and the like).

Since this problem causes the degradation of marketability of the vehicle product, the development of a means, which is capable of actively improving NVH performance of the vehicle even after the release of the vehicle product has been demanded.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a technology, in which a vibration sensor detecting vibrations generated in a floor of a vehicle is disposed, and operations of devices causing vibrations of the vehicle are controlled based on the vibrations measured by the vibration sensor to manage NVH performance of the vehicle, and further provides a system for managing noise vibration and harshness (NVH) based on floor vibration for a vehicle, in which when the vibration detected by the vibration sensor exceeds a predetermined manageable threshold value, a message inducing a driver to repair a vehicle in relation to the vibrations is output, actively managing NVH performance of the vehicle, and a control method thereof.

Various aspects of the present invention are directed to providing a system for managing noise, vibration and harshness (NVH) based on floor vibration for a vehicle, the system including: a vibration sensor, which is disposed on a floor of a vehicle and detects a vibration value; and a control module, which controls an operation of a vibration generating device of the vehicle in response to the vibration value detected by the vibration sensor, in which when the vibration value detected by the vibration sensor exceeds a predetermined first threshold value, the control module decreases the vibration by adjusting a driving parameter of the vibration generating device of the vehicle.

The system may further include a display module, which receives a message and displays information, in which when the vibration value detected by the vibration sensor exceeds a predetermined second threshold value, the control module may generate and output a notice message including information inducing a check of an NVH system and transmit the notice message to the display module.

The control module may control the operation of the vibration generating device through a control including at least one of a control of an opening amount of an air control valve (ACV) of the vehicle, a control of revolutions per minute (RPM) of an engine, and a control of electronic control unit (ECU) injection variable mapping.

The control module may filter only a band of a predetermined frequency or less in the vibration value detected and received from the vibration sensor, determine a root mean square (RMS) value, and obtain the vibration value.

The first threshold value set in the control module may be a vibration value pre-detected by the vibration sensor and stored in any one state between an idle state during initial driving of the vehicle and an idle state after a predetermined travelling distance.

The vibration value detected by the vibration sensor may include a vibration value in each of the x-axis, y-axis, and z-axis directions, and the control module may obtain the vibration value by determining an average of the vibration values in the x-axis, y-axis, and z-axis directions detected by the vibration sensor.

Various aspects of the present invention are directed to providing a method of controlling the system for managing noise, vibration and harshness (NVH) based on floor vibration for the vehicle, the method including: pre-setting a first threshold value in a control module; detecting, by a vibration sensor, vibration within the vehicle and outputting a vibration value; receiving, by the control module, a vibration value from the vibration sensor; comparing, by the control module, the received vibration value with the first threshold value; and controlling, by the control module, an operation of the vibration generating device so that the vibration generated in the vibration generating device of the vehicle is decreased when the vibration value detected by the vibration sensor exceeds the first threshold value.

The method may further include: setting a predetermined second threshold value detectable by the vibration sensor in the control module; comparing, by the control module, the vibration value received from the vibration sensor with the second threshold value; and generating and outputting, by the control module, a notice message inducing a check of an NVH system when the vibration value received from the vibration server exceeds the threshold value.

The controlling, by the control module, the operation of the vibration generating device so that the vibration generated in the vibration generating device of the vehicle is decreased when the vibration value detected by the vibration sensor in a travelling state of the vehicle exceeds the first threshold value may include at least one of a) controlling the quantity of close of an air control valve (ACV); b) controlling revolutions per minutes (RPM) of an engine; and c) controlling electronic control unit (ECU) injection variable mapping.

Through the aforementioned configuration, the system for managing NVH based on floor vibration of the vehicle of the present invention and the control method thereof have distinguishing advantages described below.

When it is determined that a vibration value detected by the vibration sensor disposed on the floor of the vehicle is larger than a first threshold value, which is detected at the idle state and is set, it is determined that the NVH characteristic is degraded and the vibration generating device, which generates the vibration of the vehicle, is controlled to decrease the generation of the vibration, so that it is possible to actively manage the NVH characteristic of the vehicle even after the release of the product.

When a vibration value detected by the vibration sensor disposed on the floor of the vehicle exceeds a threshold value, a notice message is provided, so that a driver receiving the notice message may easily recognize the state, in which the NVH characteristic deviates from the active management range, and thus, the corresponding vehicle may be induced to be immediately checked at a time at which the NVH performance is aggravated, always maintaining the good NVH characteristic of the vehicle and improving marketability of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
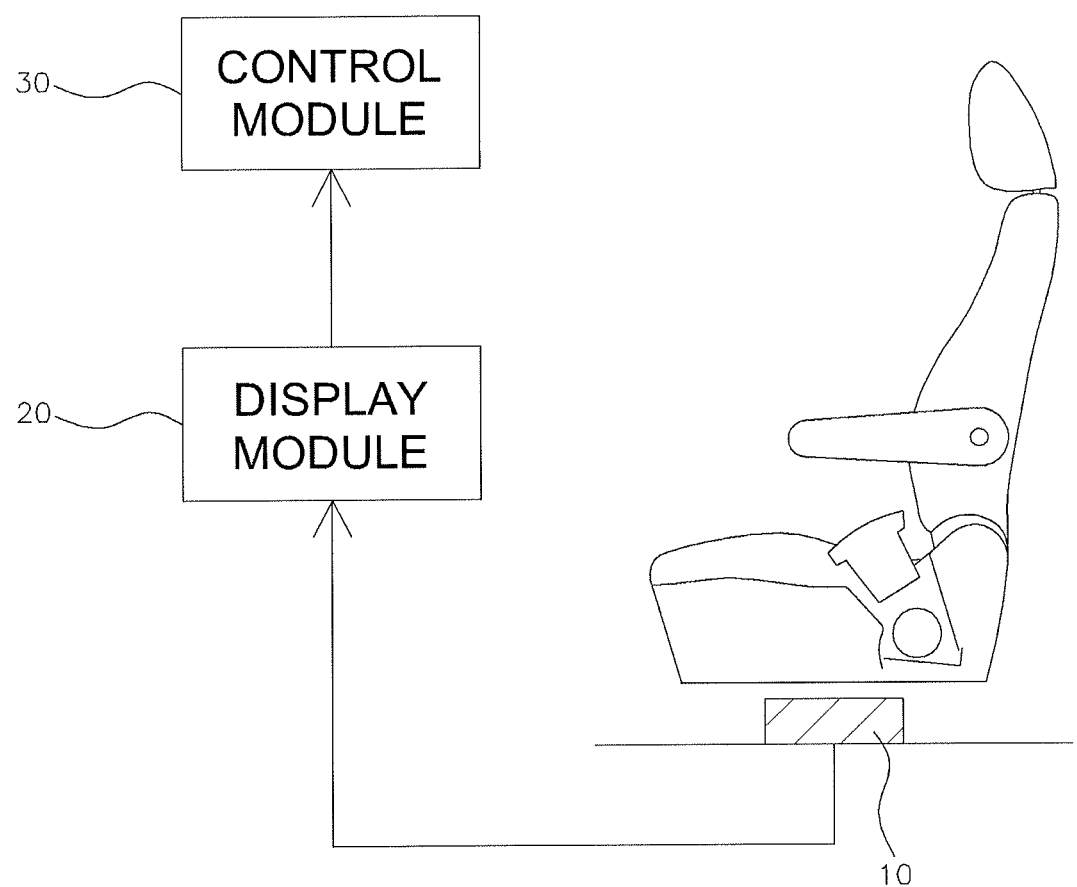
FIG. 1 is a diagram schematically illustrating a system for managing NVH based on floor vibration for a vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

Hereinafter, before particularly describing the technical configuration of the present invention, it shall not be understood that terms or words used throughout the present specification and the claims are limited to and interpreted as general or dictionary meanings, and the corresponding terms or words are described based on "the principle that the inventor can appropriately define a concept of a term for describing his or her own invention with the best method" and shall be construed as the meaning and the concept according with the technical spirit of the present invention. Accordingly, the embodiments described in the present specification and the technical configurations illustrated in the drawings are simply the most exemplary embodiment of the present invention and do not represent all of the technical spirit of the present invention, and thus it shall be understood that there are various equivalent matters and modified examples, which may replace the configurations, at the time of the filing of the present application. Further, the terms used in the present specification are used for describing a specific exemplary embodiment for the easy understanding, and do not intend to limit the present invention. In the present specification, a constituent element described in a singular form includes a plural form unless it is separately specified.

Various embodiments of the present invention relates to a system for managing noise vibration and harshness (NVH) based on floor vibration for a vehicle, and a control method thereof, and to a technology, in which a vibration sensor detecting vibrations generated in a floor of a vehicle is disposed, and operations of devices causing vibrations of the vehicle are controlled based on the vibrations measured by the vibration sensor to manage NVH performance of the vehicle, and further, more particularly, to a technology, in which when the vibration detected by the vibration sensor exceeds a predetermined manageable threshold value, a message inducing a driver to repair a vehicle in relation to the vibrations is output, actively managing NVH performance of the vehicle.

Hereinafter, an exemplary embodiment of the present invention having the aforementioned configuration will be described in detail with reference to the drawings.

Figure 2:
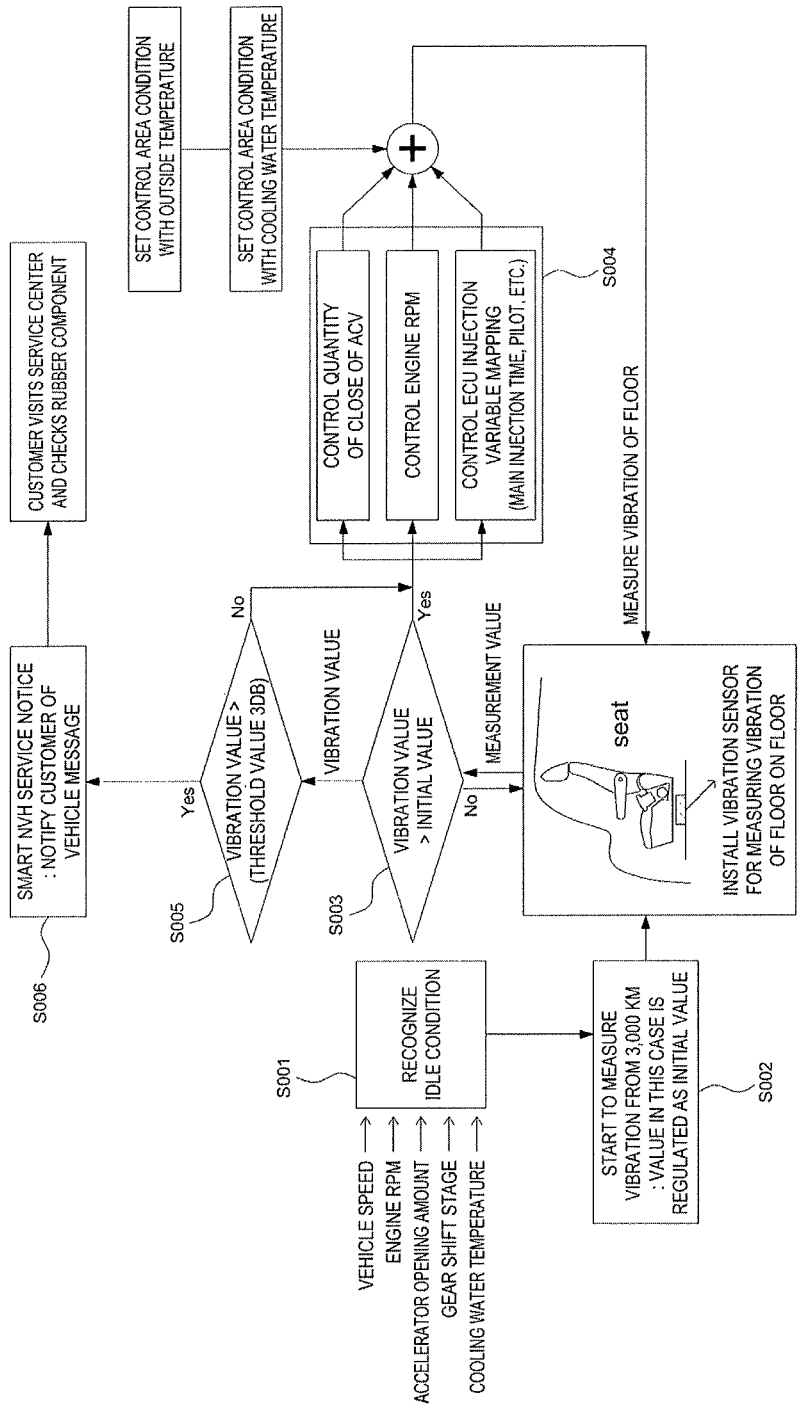
FIG. 2 is a flowchart illustrating a method of managing NVH based on floor vibration for a vehicle according to an exemplary embodiment of the present invention.

FIG. 1 is a diagram schematically illustrating a system for managing NVH based on floor vibration for a vehicle according to an exemplary embodiment of the present invention, and FIG. 2 is a flowchart illustrating a method of managing NVH based on floor vibration for a vehicle according to an exemplary embodiment of the present invention.

As illustrated in the drawings, the system for managing NVH based on floor vibration for a vehicle of the present invention includes a vibration sensor 10, which is disposed at an internal side of the vehicle on a floor of the vehicle, and detects vibration (NVH) generated and transmitted according to the driving of the vehicle, and a control module 20, which receives a vibration value detected by the vibration sensor 10 and controls an operation of a vibration generating device causing vehicle vibration based on the received vibration value. Here, the vibration sensor 10 may periodically or continuously detect vibration generated and transmitted in relation to the driving of the vehicle, and transmit the detected vibration value to the control module 20.

When the vibration of the floor of the vehicle worsens, vibration of a steering wheel and a seat, which a driver most easily feels, worsens, so that the vibration sensor 10 is disposed on the floor of the vehicle. The position of the vibration sensor 10 may be a position, for example, a lower vehicle body of a driver's seat, at which it is possible to detect the vibration most similar to vibration felt by the driver.

The vibration value detected by the vibration sensor 10 may include all of the x-axis, y-axis, and z-axis directions, or may include a vibration value in a single axis direction. In the instant case, when the vibration sensor 10 is formed to detect the vibration value including all of the plurality of directions (the x-axis, y-axis, and z-axis directions), the control module 20 may individually obtain each of the vibration values in the x-axis, y-axis, and z-axis directions detected by the vibration sensor 10, or may determine an average of the vibration values in the x-axis, y-axis, and z-axis directions detected by the vibration sensor 10 and obtain the vibration value.

In the exemplary embodiment of the present invention, the control module 20 recognizes an idle state (S001), presets and stores a first threshold value in the idle state (S002), compares the vibration value detected by the vibration sensor 10 in a vehicle travelling state with the first threshold value (S003), and controls a driving parameter of the vibration generating device generating the vibration of the vehicle (controls the driving parameter so that the generation of the vibration is decreased) when the vibration exceeding the first threshold value is generated (S004).

Herein, the idle state may be understood to include a general stop state of the vehicle, and further, also include the case where a driver steps on a brake pedal at a P-stage, an N-stage, and a D-stage, which are the gear shift stages of the vehicle, so that a speed of the vehicle is 0.

The control of the driving parameter of the vibration generating device may include one or more of the control of the quantity of close of an air control valve (ACV) of the vehicle, the control of revolutions per minute (RPM) of an engine, and the control of electronic control unit (ECU) injection variable mapping, and detailed matters thereof will be described below.

Control of the Quantity of Close of an ACV of the Vehicle

Figure 3:
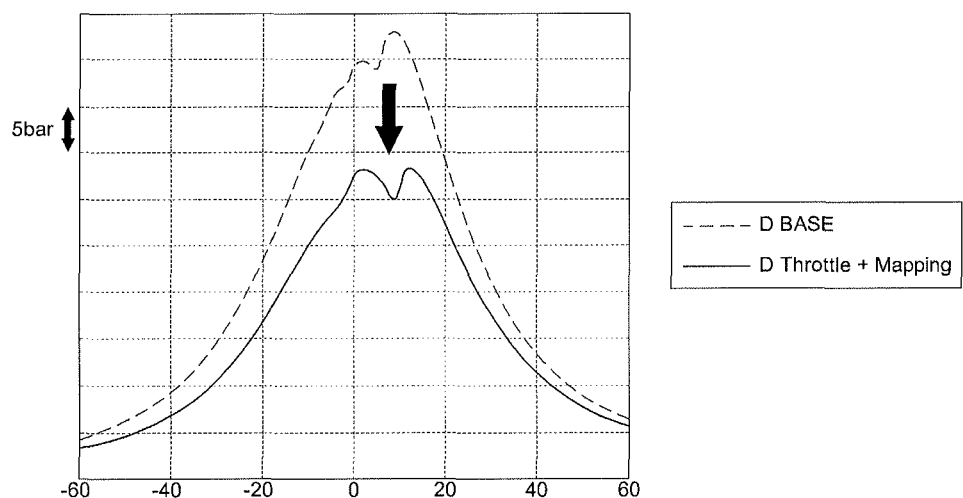
FIG. 3 is a diagram representing a comparison of a maximum combustion pressure decreased according to a decrease in inflow air of an engine.
Figure 3:
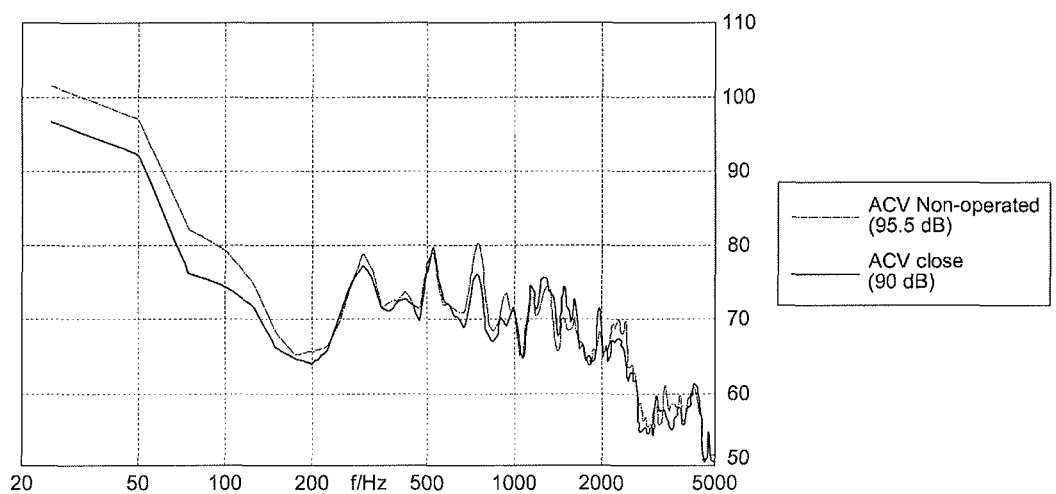

The control module 20 may perform a control of adjusting the quantity of air flowing to the engine by controlling an opening or closing operation of the ACV of the vehicle. When air flowing into the engine is decreased, a maximum combustion pressure is decreased. FIG. 3 represents a comparison of a maximum combustion pressure decreased (by 15 bars) according to a decrease in inflow air of the engine. Accordingly, because the maximum combustion pressure of the engine is decreased, combustion exciting force transmitted to the vehicle is decreased, so that the vibration may be decreased.

In the instant case, when the air control valve is completely closed, the problems including hesitation, early start delay feeling, and exhaust gas, may be caused, so that the quantity of closing may be appropriately set in consideration of side effects.

Control of RPM of the Engine

The control module 20 may adjust an RPM of the engine of the vehicle.

In the control of the RPM of the engine, for example, the RPM of the engine is set to a range of ±30 RPM or ±50 RPM from the RPM of the engine in the idle state to avoid the number of sharing vibrations among various constituent elements within the vehicle.

Control of ECU Injection Variable Mapping

The control module 20 may control the mapping of the injection variable of the ECU.

In the control of the ECU injection variable mapping, a test of sensitivity to a fuel injection time, fuel injection pressure, and the quantity of fuel injected is pre-performed within a range, in which exhaust gas and fuel efficiency do not have much side effects, the control is performed while giving a priority to a specific injection variable, and the mapping, in which combustion exciting force of the engine is decreased, is set.

In the control of the quantity of close of the ACV, the control of the RPM of the engine, and the control of the ECU injection variable mapping, the control areas thereof may be set in connection with an outside air temperature and a cooling water temperature.

The control of the driving parameter corresponds to the description of the exemplary embodiment of the system for managing NVH based on floor vibration of the vehicle according to an exemplary embodiment of the present invention, and the driving parameter controlled by the control module is not limited to the driving parameter described herein as long as it does not depart from the technical spirit of the present invention. For example, the driving parameters have been described based on the assumption that the present invention is applied to a general vehicle, for example, a gasoline/diesel vehicle, an HEV/PHEV, and an EV vehicle, but the PHEV and the EV may also further include a control of a driving parameter of a motor.

In the meantime, the first threshold value predetermined and stored in the control module 20 may be the vibration value detected by the vibration sensor 10 in the idle state, and to this end, the control module 20 may receive a vehicle speed, the RPM of the engine, an accelerator opening amount, the stage of gear shift, or a cooling water temperature from a controller of the vehicle in connection with the controller, for example, a body control module (BCM), of the vehicle, and recognize the idle state of the vehicle.

The first threshold value may be the vibration value detected by the vibration sensor 10 in the idle state at a time after a predetermined travelling distance, for example, a travelling distance of 3,000 km. Because the time corresponds to a completion time of, so called, vehicle break-in, the first threshold value is set with the vibration value detected at the time after the predetermined travelling distance.

In the exemplary embodiment of the present invention, the control module 20 filters the vibration value received from the vibration sensor 10 and prevents erroneous recognition. The control module 20 filters only a band (for example, a band of 100 Hz or less) of a predetermined frequency or less in the vibration value detected and received from the vibration sensor 10, determines the filtered band as a root mean square (RMS) value, and obtains and uses the vibration value. The reason for filtering the detected vibration value with the band of the predetermined frequency or less is to filter and exclude vibrations transmitted by external factors, not by the vibration generating device of the vehicle.

In the meantime, the vibration generating device may include any constituent element of the vehicle essentially generating vibration in relation to the driving of the vehicle, or any constituent element of the vehicle, which does not directly generate vibration when being operated, but causes other constituent elements to generate vibrations by the operation. For example, the vibration generating device may include a power train of the vehicle or the ACV of the vehicle.

Through the aforementioned configuration, when the control module 20 determines that the vibration value detected by the vibration sensor 10 disposed on the floor of the vehicle is larger than the first threshold value, which is detected at the idle state and is set, the control module 20 determines that the NVH characteristic is degraded and controls the vibration generating device, which generates the vibration of the vehicle, to decrease the generation of the vibration, so that it is possible to actively manage the NVH characteristic of the vehicle even after the release of the product.

In the meantime, in the exemplary embodiment of the present invention, the control module 20 pre-sets a predetermined second threshold value detectible by the vibration sensor 10. The second threshold value corresponds to a vibration value exceeding the range, in which the control module 20 is configured for actively managing the NVH characteristic by controlling the operation of the vibration generating device, and corresponds to a vibration value measurable when an aggravating cause by hardening of the constituent elements for reducing the vibration, for example, the kind of rubber (a mount, a radiator bush, a heater hose, an intercooler hose, and the like) for reducing the vibration, and the like is generated. The second threshold value may be changed according to a characteristic of each vehicle.

Accordingly, the control module 20 pre-sets the second threshold value and compares the vibration value detected by the vibration sensor 10 and the second threshold value (S005), and when the vibration value detected by the vibration sensor 10 exceeds the second threshold value, the control module 20 generates and outputs a notice message inducing a driver to check an NVH system to display the notice message inducing the check of the vehicle (S006).

To this end, the system for managing NVH based on floor vibration of the vehicle according to an exemplary embodiment of the present invention may further include a display module 30 which is configured for displaying the notice message.

Here, the display module 30 may include, for example, a cluster module of a vehicle, an AVN module, a telematics module, and/or a smart phone.

Accordingly, the driver receiving the notice message may easily recognize the state, in which the NVH characteristic deviates from the active management range, and thus, the corresponding vehicle may be induced to be immediately checked at the time at which the NVH performance is aggravated, always maintaining the good NVH characteristic of the vehicle and improving marketability of the vehicle.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for managing noise, vibration and harshness (NVH) based on floor vibration for a vehicle, the system comprising:
   a vibration sensor, which is disposed on a floor of the vehicle and is configured to detect a vibration value thereof;
   a control module, which controls an operation of a vibration generating device of the vehicle in response to the vibration value detected by the vibration sensor; and
   a display module, which is configured to receive a message and to display information,
   wherein when the vibration value detected by the vibration sensor exceeds a predetermined first threshold value, the control module is configured to decrease the vibration by adjusting a driving parameter of the vibration generating device of the vehicle, and
   wherein when the vibration value detected by the vibration sensor exceeds a predetermined second threshold value, the control module is configured to generate and output a notice message including information inducing a check of an NVH system and to transmit the notice message to the display module.

2. The system of claim 1, wherein the control module is configured to control the operation of the vibration generating device through at least one of a control of an opening amount of an air control valve (ACV) of the vehicle, a control of revolutions per minute (RPM) of an engine, and a control of electronic control unit (ECU) injection variable mapping.

3. The system of claim 1, wherein the control module is configured to filter a band of a predetermined frequency or less in the vibration value detected and received from the vibration sensor, is configured to determine a root mean square (RMS) value, and is configured to obtain the vibration value.

4. The system of claim 1, wherein the first threshold value set in the control module is a vibration value pre-detected by the vibration sensor and stored in a state between an idle state during initial driving of the vehicle and an idle state after a predetermined travelling distance of the vehicle.

5. The system of claim 1, wherein the vibration value detected by the vibration sensor includes a vibration value in each of x-axis, y-axis, and z-axis directions.

6. The system of claim 5, wherein the control module is configured to obtain the vibration value by determining an average of the vibration values in the x-axis, y-axis, and z-axis directions detected by the vibration sensor.

7. A method of controlling the system for managing noise, vibration and harshness (NVH) based on floor vibration for the vehicle of claim 1, the method including:
   pre-setting the first threshold value in the control module;
   detecting, by the vibration sensor, the vibration within the vehicle and outputting the vibration value;
   receiving, by the control module, the vibration value from the vibration sensor;
   comparing, by the control module, the received vibration value with the first threshold value; and
   controlling, by the control module, an operation of the vibration generating device wherein the vibration generated in the vibration generating device of the vehicle is decreased when the vibration value detected by the vibration sensor exceeds the first threshold value.

8. The method of claim 7, further including:
   setting the predetermined second threshold value detectable by the vibration sensor in the control module;
   comparing, by the control module, the vibration value received from the vibration sensor with the second threshold value; and
   generating and outputting, by the control module, the notice message inducing the check of the NVH system when the vibration value received from the vibration sensor exceeds the second threshold value.

9. The method of claim 7, wherein the controlling, by the control module, the operation of the vibration generating device so that the vibration generated in the vibration generating device of the vehicle is decreased when the vibration value detected by the vibration sensor exceeds the first threshold value in a travelling state of the vehicle includes at least one of
   a) controlling a quantity of closing of an air control valve (ACV);
   b) controlling revolutions per minutes (RPM) of an engine; and
   c) controlling electronic control unit (ECU) injection variable mapping.

* * * * *